(12) United States Patent
Köth

(10) Patent No.: US 8,915,080 B2
(45) Date of Patent: Dec. 23, 2014

(54) PRESSURE GENERATOR OF A HYDRAULIC VEHICLE BRAKE SYSTEM AND OPERATING METHOD FOR THIS

(75) Inventor: Boris Köth, Weitersburg (DE)

(73) Assignee: Lucas Automotive GmbH, Koblenz (DE)

( * ) Notice: Subject to any disclaimer, the term of this patent is extended or adjusted under 35 U.S.C. 154(b) by 1009 days.

(21) Appl. No.: 12/988,394

(22) PCT Filed: Mar. 25, 2009

(86) PCT No.: PCT/EP2009/002200
§ 371 (c)(1),
(2), (4) Date: Jan. 25, 2011

(87) PCT Pub. No.: WO2009/127317
PCT Pub. Date: Oct. 22, 2009

(65) Prior Publication Data
US 2011/0107759 A1    May 12, 2011

(30) Foreign Application Priority Data

Apr. 16, 2008  (DE) .................. 10 2008 019 148

(51) Int. Cl.
| | |
|---|---|
| *B60T 17/04* | (2006.01) |
| *F16D 31/02* | (2006.01) |
| *B60T 8/48* | (2006.01) |
| *B60T 8/40* | (2006.01) |
| *F04B 49/22* | (2006.01) |

(52) U.S. Cl.
CPC ............. *B60T 8/4031* (2013.01); *B60T 8/4872* (2013.01); *B60T 8/4054* (2013.01); *F04B 49/225* (2013.01)
USPC ............................................. 60/566; 60/429

(58) Field of Classification Search
USPC .......... 60/429, 430, 565, 566; 303/15, 115.1, 303/DIG. 1, DIG. 2
See application file for complete search history.

(56) References Cited

U.S. PATENT DOCUMENTS

| | | | |
|---|---|---|---|
| 5,167,493 | A | 12/1992 | Kobari |
| 6,446,435 | B1 | 9/2002 | Willmann et al. |
| 6,796,619 | B1 | 9/2004 | Hinz et al. |
| 2006/0284477 | A1 | 12/2006 | Yang |

FOREIGN PATENT DOCUMENTS

| | | |
|---|---|---|
| CN | 1880137 A | 12/2006 |
| DE | 4138313 A1 | 5/1992 |
| DE | 4438721 A1 | 5/1996 |
| EP | 1408388 A1 | 4/2004 |
| EP | 1733942 A1 | 12/2006 |
| WO | 9800322 A1 | 1/1998 |
| WO | 9964283 A1 | 12/1999 |

OTHER PUBLICATIONS

Chinese First Notification of Office Action and Search Report, Application No. 200980117901.6 dated Oct. 10, 2012.

*Primary Examiner* — Michael Leslie
(74) *Attorney, Agent, or Firm* — MacMillan, Sobanski & Todd, LLC

(57) ABSTRACT

The present invention relates to a pressure generator for a hydraulic vehicle brake system for the regulated generation of a hydraulic brake pressure in a brake circuit, the pressure generator having a multiple-piston pump for delivering a brake fluid with at least two pump pistons and associated pressure chambers, on which the pump pistons act, an actuator for actuating the multiple-piston pump, and a fluid feed line which extends to the pressure chambers and is configured for connection to a storage container, in which a hydraulic fluid is stored. At least one valve is arranged in the fluid feed line and divides the latter into a first section which is arranged upstream of the valve and into a second section which is arranged downstream of the valve, the valve being configured to optionally at least partly shut off or open the second section of the fluid feed line and therefore to control the fluid supply of at least one pressure chamber.

5 Claims, 2 Drawing Sheets

PRESSURE GENERATOR OF A HYDRAULIC VEHICLE BRAKE SYSTEM AND OPERATING METHOD FOR THIS

CROSS-REFERENCE TO RELATED APPLICATIONS

This application is a national stage of International Application No. PCT/EP2009/002200 filed Mar. 25, 2009, the disclosures of which are incorporated herein by reference in entirety, and which claimed priority to German Patent Application No. 10 2008 019 148.5 filed Apr. 16, 2008, the disclosures of which are incorporated herein by reference in entirety.

BACKGROUND OF THE INVENTION

The present invention relates generally to the hydraulic pressure generation in a vehicle brake system. The invention is directed in particular to a pressure generator with a multiple-piston pump.

Modern hydraulic or electrohydraulic vehicle brake systems require reliable pressure generators in order to be able to implement safety-related functions such as preventing locking of the brake or preventing spinning wheels. For this purpose, driver assistance systems, such as anti-lock control (ABS), anti-slip control (ASR) or driving dynamics control and adaptive speed control (ACC), cooperate with a pressure generator of the vehicle brake system.

Known brake systems of this type work with a hydraulic fluid as the brake fluid, which is partly stored in a storage container provided therefor. To generate brake pressure, the brake fluid is put under pressure in a brake circuit and in this way acts to activate one or more wheel brakes. In the case of a braking procedure initiated by a driver (referred to hereinafter as driver braking), a master brake cylinder actuated by the driver pressing a foot pedal serves this purpose. In contrast to this, in the case of braking which is not requested by the driver but by a driver assistance system (referred to hereinafter as system braking), the brake pressure required is generated by a pressure generator. A third possible operating state of a vehicle brake system of this type is mixed operation, i.e. braking which is initiated both by the driver and by the system (referred to hereinafter as mixed braking).

For a better understanding, a vehicle brake system from the prior art is described below. According to FIG. 1, this system has two brake circuits A and B which are of substantially identical construction. Therefore, only the first brake circuit A which supplies two wheel brakes 50 and 60 is described in more detail.

In the case of driver braking, a master cylinder 12 delivers a brake fluid from a storage container 14 to the two brake circuits A and B. Between the master cylinder 12 and the wheel brakes 50 and 60 there is a hydraulic connection which is controlled by valves 51, 52, 61, 62, 71 and 72. In the case of pure driver braking, the valves 51, 61 and 71 each assume their flow-through position, while the valves 52, 62 and 72 remain in a shut-off position. The valves normally used here are so-called 2/2-port directional control valves, i.e. valves with two ports and two switching positions (open and closed). In the case of pure driver braking, only the brake pressure FBD (driver brake pressure) generated in a known manner by the master cylinder 12 and optionally an additional brake booster 16 acts in the wheel brakes 50 and 60.

In the case of system braking, in contrast, the brake pressure SBD (system brake pressure) is generated by a pressure generator 18, as already explained above. For this purpose, the latter has an actuator 20 which drives a piston pump, in particular a multiple-piston pump 22. The latter can have, as shown in FIG. 1, for example three pressure chambers $24_1$, $24_2$, $24_3$ (denoted generally by the reference symbol 24) for each brake circuit A and B, respectively, and associated pump pistons which act on the pressure chambers and are connected to the actuator 20 via a common eccentric. The multiple-piston pump 22 is connected, on the inlet side, to the storage container 14 of the brake system 10 and in the actuated state sucks in brake fluid therefrom which is delivered by the pump pistons in the direction of the wheel brakes 50 and 60 by the action of the pump pistons on the pressure chambers $24_1$, $24_2$, $24_3$.

In the case of anti-lock control (ABS), locking of the wheels during braking is to be prevented. For this purpose, the brake pressure GBD (total brake pressure) acting on the wheel brakes 50 and 60 is set by a temporal sequence of pressure build-up, pressure maintaining and pressure reduction phases. This takes place by activating the valves 51, 52 and 61, 62 respectively associated with the wheel brakes 50 and 60. These valves are set in a known manner so that, after a desired brake pressure GBD has been reached, this is maintained during the pressure maintaining phase (closed valve position), while in a pressure build-up or pressure reduction phase the hydraulic fluid can flow to the wheel brake 50 and 60 or away from it (open valve position). For intermediate storage of the hydraulic fluid, use is made of a low-pressure storage reservoir 26, from which the hydraulic fluid is delivered back to the brake circuit A and B by the multiple-piston pump 22.

In the operating state of ABS control, there is usually a mixed operation of the brake system 10, since, besides the system-initiated pressure generation by the pressure generator 18, the driver additionally actuates the master cylinder 12 via a foot pedal 28.

In the case of normal driver braking, brake pressures in the range of up to about 80 bar usually occur, depending on the use of a brake booster 16 and/or the brake force introduced by the driver via the foot pedal 28. However, in the above-described mixed operation in connection with ABS control, pressures of about 200 bar can be generated in special driving situations. This can happen particularly if ABS control continues for quite a long time, for example because the roadway has a low coefficient of friction (μ low). In this case, the low-pressure storage reservoir 26 is completely filled, so that the pump pistons have to deliver against the prevailing brake pressure GBD and in so doing increase the latter further. At pressures of the order of about 200 bar, however, the actuator 20 driving the pump pistons may stop, as shown in practice, owing to the prevailing loading by the fluid pressure acting against the delivery direction of the pump pistons. This has the result that the entire ABS control fails and therefore cannot perform its safety-related function any longer.

In order to counteract such a failure, solution approaches from the prior art are known, in which the reaction load acting on the pump pistons is to be reduced by decreasing the active area of the pump pistons. However, decreasing the active areas of the pump pistons also has a detrimental effect on the performance of the multiple-piston pump 22 with respect to its delivery volume and the dynamics.

BRIEF SUMMARY OF THE INVENTION

It is therefore a feature of the present invention to provide a pressure generator which can ensure safe and reliable functioning even in the above-described braking situations without its performance in normal operation (i.e. when such peak values for a prevailing brake pressure do not occur) being reduced.

This feature is achieved by a pressure generator having the features specified in claim 1. The pressure generator according to the invention has, for this purpose, a multiple-piston pump for delivering a brake fluid with at least two pump pistons and associated pressure chambers, on which the pump pistons act, an actuator for actuating the multiple-piston pump, and a fluid feed line which extends to the pressure chambers and is configured for connection to a storage container, in which a hydraulic fluid is stored. At least one valve is arranged in the fluid feed line and divides the latter into a first section which is arranged upstream of the valve and into a second section which is arranged downstream of the valve. The valve is configured to optionally at least partly shut off or open the second section of the fluid feed line and therefore to control the fluid supply of at least one pressure chamber.

In this way, on occurrence of pressure peaks of around 200 bar, it is possible to reduce the flow rate of the brake fluid delivered by the pressure generator or the multiple-piston pump and therefore reduce the reaction load acting on the pump pistons. In such a case, the actuator drives the pump pistons only to the extent that the associated pressure chambers are supplied with brake fluid (restricted delivery capacity). At the same time, in normal operation, i.e. at pressures around up to about 80 bar, it is possible to operate the multiple-piston pump at full delivery capacity.

Furthermore, it can be provided that the fluid feed line has, on the pump side, a separate connecting section for each pressure chamber, the valve being arranged in at least one of the separate connecting sections. In this way, each pressure chamber can be supplied with fluid in a valve-controlled manner independently of the other pressure chambers. In a development of the invention, it can be provided that at least two connecting sections are connected in series in the flow direction of the fluid and the valve is arranged in one connecting section of the connecting sections connected in series, in order to at least partly shut off or open the connecting sections following in the flow direction.

Such a series connection of the connecting sections (i.e. where the connecting sections are connected to one another and brake fluid must first pass through first connecting sections in order to reach the sections following in the flow direction) has the advantage that with a single valve the fluid supply of a plurality of connecting sections, following in the flow direction, of the associated pressure chambers can be controlled. Here, it is conceivable for the valve to be arranged in a first connecting section and thus control the fluid supply of all the following pressure chambers. Alternatively, the valve can be arranged in a last connecting section and thus control only the fluid supply of the last pressure chamber. Finally, the valve can be arranged in an intermediate connecting section.

Furthermore, it is also possible to connect in series a plurality of valves in the connecting sections. Thus, for example, a respective valve can be arranged in the first and the last connecting section. Besides control of the fluid supply, this enables optionally the disconnection of individual connecting sections. Thus, a valve arranged in a first connecting section can reduce the fluid supply of the following pressure chambers and a further valve arranged in a last connecting section can optionally completely shut off the fluid supply of the following pressure chamber.

According to a preferred refinement of the invention, the valve is activatable. In a development of the invention, the valve can be electrically activatable. Alternatively, however, other ways of setting the valve are also conceivable, for instance it can also be actuated pneumatically, hydraulically, mechanically or manually.

Alternatively, it can be provided that the valve changes its valve position in dependence on a brake pressure prevailing in the brake circuit, so that the flow-through volume of the valve is automatically controlled, i.e. without external actuation or activation.

According to a further aspect of the present invention, the feature is achieved with the aid of a method for operating a pressure generator having the above-mentioned features in a hydraulic vehicle brake system. This method comprises the steps of actuating the multiple-piston pump, of detecting a brake pressure prevailing in the brake circuit, and of pressure-dependent activating of the at least one valve arranged in the fluid feed line for regulating the fluid supply of at least one pressure chamber of the multiple-piston pump.

Other advantages of this invention will become apparent to those skilled in the art from the following detailed description of the preferred embodiments, when read in light of the accompanying drawings.

DETAILED DESCRIPTION OF THE INVENTION

Figure 1:
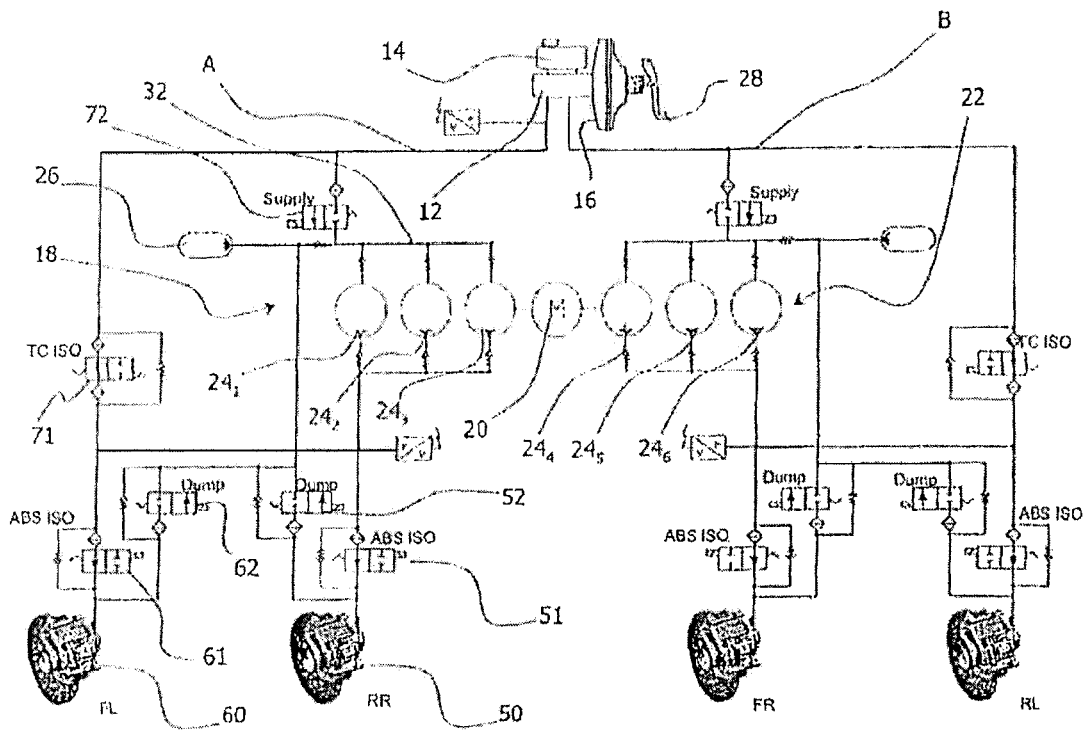
FIG. 1 shows a schematic view of a vehicle brake system according to the prior art.

FIG. 1 shows, as already explained in more detail at the beginning, a vehicle brake system from the prior art which comprises two brake circuits A and B. On actuation of a foot pedal 28 by the driver of the vehicle, a master cylinder 12 delivers a brake fluid from a storage container 14 to the two identical brake circuits A and B. In this way, the respective wheel brakes 50 and 60 are supplied via the brake circuits A and B and a driver brake pressure FBD is built up in the wheel brakes 50 and 60.

On a signal of the brake system, a pressure generator 18 generates a system brake pressure SBD in the wheel brakes 50 and 60 by driving a multiple-piston pump 22 by means of an actuator 20. In the example illustrated in FIG. 1, the multiple-piston pump 22 comprises six pressure chambers $24_1$, $24_2$, $24_3$, $24_4$, $24_5$, $24_6$ (denoted generally by the reference symbol 24), the pressure chambers $24_1$, $24_2$, $24_3$ being associated with the brake circuit A. The multiple-piston pump 22 is furthermore connected to the storage container 14, via a fluid feed line 32 extending to the pressure chambers 24 of the multiple-piston pump 22, and by means of its pressure chambers 24 associated with the pump pistons delivers the brake fluid to the brake circuits A and B.

Figure 2:
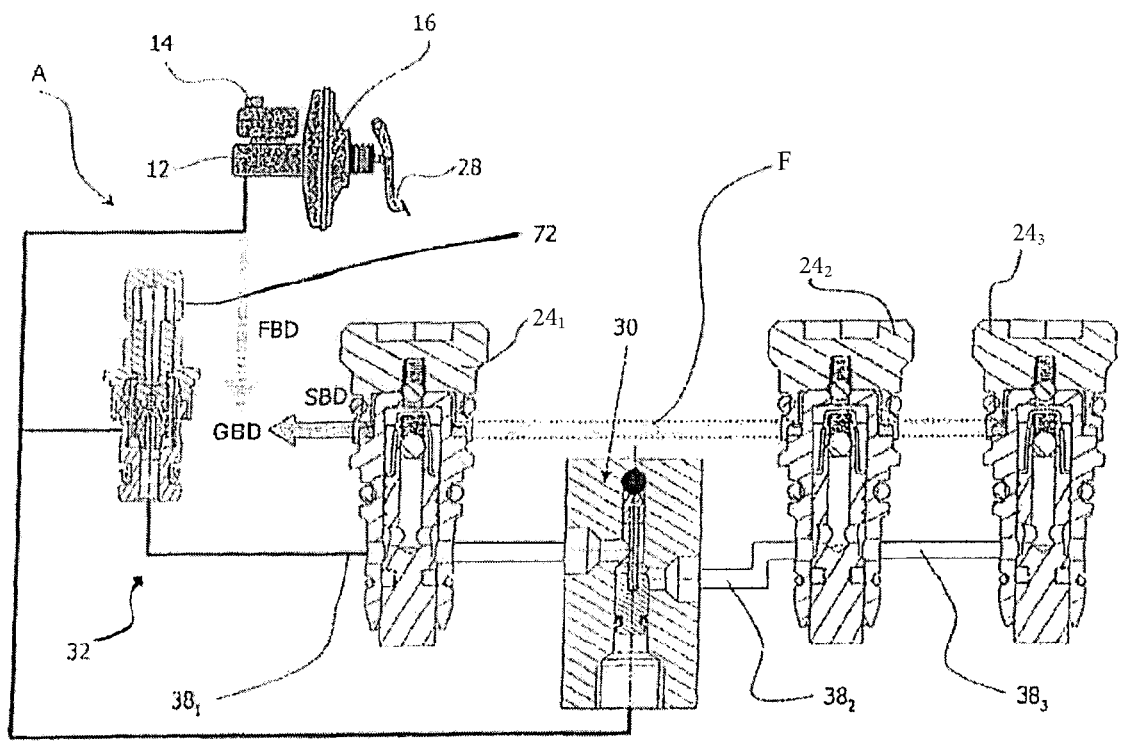
FIG. 2 shows a schematic view of a possible installation situation of a valve according to the invention in a brake circuit.

FIG. 2 shows an exemplary installation situation of a valve 30 according to the invention in a brake circuit A, illustrated in a simplified manner, according to FIG. 1. The brake circuit A has a valve 72 and a fluid feed line 32 which connects three pressure chambers $24_1$, $24_2$, $24_3$ of a multiple-piston pump to the storage container 14 of the brake system. In a pump-side region, i.e. a section facing the pumps, the fluid feed line has three separate connecting sections $38_1$, $38_2$, $38_3$ which are each associated with a pressure chamber $24_1$, $24_2$, $24_3$.

The valve 30 is arranged between two of the connecting sections $38_1$ and $38_2$ of the fluid feed line 32 which are connected in series and thus controls the fluid supply of the associated pressure chambers $24_2$ and $24_3$ which, in the open position of the valve, are supplied with brake fluid by the connecting sections $38_2$ and $38_3$ following in the flow direction of the fluid.

In the illustrated example of FIG. 2, the fluid supply of the pressure chambers $24_2$ and $24_3$ is completely stopped by means of the valve 30, so that the associated pump pistons idle virtually without resistance, i.e. deliver no brake fluid to the wheel brakes, as indicated by the dotted arrow F'. In the brake circuit A illustrated in FIG. 2, the system brake pressure SBD is generated only by the first pump piston associated with the pressure chamber $24_1$.

In addition, in the case of the driving situation illustrated in FIG. 2, the master brake cylinder 12 is actuated by the driver pressing the foot pedal 28, so that a corresponding driver brake pressure FBD is added to the system brake pressure SBD. The upstream valve 72, as a result of its open position, enables the pressure generator 18 to supply the entire fluid feed line 32 with brake fluid from the storage container 14. The driver brake pressure FBD can be further increased by the brake booster 16, as is customary in modern brake systems.

If the valve 30 is moved into an open position, for example by pressure-dependent automatic control or electrical activation of the valve, the connecting sections $38_2$ and $38_3$ are supplied with brake fluid again and on actuation of the actuator, which drives the pump piston of a multiple-piston pump (not shown in FIG. 2), generate a correspondingly higher system brake pressure SBD.

Figure 3:
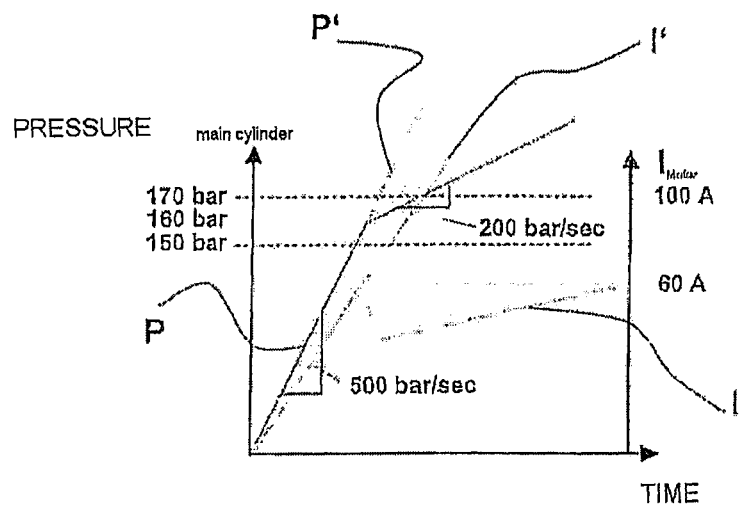
FIG. 3 shows a diagram for illustrating the pressure profile and current-consumption profile with and without a valve according to the invention.

FIG. 3 shows, by way of example, a diagram for illustrating a pressure profile P to be expected over time after actuation of a valve according to the invention in the closing direction, i.e. when the fluid supply of at least one pressure chamber 24 of the pump 22 is reduced, or in the open position of a valve according to the invention (indicated by the dotted line P'). Also shown is the current consumption I of the motor to be expected for actuating the multiple-piston pump over time after actuation of a valve according to the invention in the closing direction or in the open position of a valve according to the invention (indicated by dotted line I').

In the phase of the pressure increase, the valve 30 is driven as soon as the fluid pressure reaches a certain region, in the illustrated example about 150 to 170 bar. In this way, the connecting sections arranged downstream of the valve in the flow direction of the fluid are completely or at least partly shut off and therefore—as already explained above—the fluid supply of the pressure chambers connected to these connecting sections is reduced. Consequently, their associated pressure pistons deliver only a reduced fluid quantity or no more brake fluid at all. From this instant, the fluid pressure P no longer rises to the same degree as before. This is evident in the diagram of FIG. 3 from the reduced gradient of the pressure curve after connection of the valve according to the invention in the fluid feed line.

FIG. 3 likewise shows that the connection of the valve influences the current consumption of the motor, illustrated by the consumption curve I, which drives the multiple-piston pump. With actuation of the valve in the closing direction and therefore reduction of the fluid quantity delivered by the multiple-piston pump, the current consumption I falls markedly. Since, in the further course, the fluid pressure P nevertheless continues to build up, the consumption I also rises again, but to a lower level owing to the reduced delivery capacity.

FIG. 3 thus shows clearly how the feature of providing a pressure generator which can ensure safe and reliable functioning even in braking situations in which pressure peak values are reached, without reducing its performance in normal operation, is met with the pressure generator according to the invention.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. Pressure generator for a hydraulic vehicle brake system for the regulated generation of a hydraulic brake pressure in a brake circuit, the pressure generator having:
   a multiple-piston pump for delivering a brake fluid with at least two pump pistons and associated pressure chambers, on which the pump pistons act,
   an actuator for actuating the multiple-piston pump, and
   a fluid feed line which extends to the pressure chambers and is configured for
   connection to a storage container, in which a hydraulic fluid is stored, at least one valve being arranged in the fluid feed line and dividing the fluid feed line into a first section which is arranged upstream of the valve and into a second section which is arranged downstream of the valve, the valve being configured to optionally at least partly shut off or open the second section of the fluid feed line and therefore to control the fluid supply of at least one pressure chamber,
   wherein the fluid feed line has, on the pump side, a separate connecting section for each pressure chamber, the valve being arranged in at least one of the separate connecting sections, and
   wherein at least two connecting sections are connected in series in the flow direction of the fluid and the valve is arranged in one connecting section of the connecting sections connected in series, in order to at least partly shut off or open the connecting sections following in the flow direction.

2. Pressure generator according to claim 1, wherein the valve is activatable.

3. Pressure generator according to claim 2, wherein the valve is electrically activatable.

4. Pressure generator according to claim 1, wherein the valve is configured to change its valve position in dependence on a brake pressure prevailing in the brake circuit.

5. Method for operating a pressure generator according to claim 1 in a hydraulic vehicle brake system, comprising the following steps:
   actuating the multiple-piston pump;
   detecting a brake pressure prevailing in the brake circuit; and
   pressure-dependent activating of the at least one valve arranged in the fluid feed line for regulating the fluid supply of at least one pressure chamber.

* * * * *